Patented Aug. 22, 1944

2,356,210

UNITED STATES PATENT OFFICE 2,356,210

PRIMING COMPOSITION

Willi Brün, Bridgeport, Conn., assignor to Remington Arms Company, Inc., a corporation of Delaware No Drawing. Application July 22, 1941,
Serial No. 403,535

7 Claims. (Cl. 52—4)

This invention relates to the manufacture of ammunition, especially the prevention of mass detonation during the handling of ammunition components containing the priming mixtures.

It is essential, to quantity production, that rim-fire shells, after the priming mixture has been placed therein, be handled (tumbled, etc.) rather roughly in lots of many thousands. Under these circumstances individual priming charges are apt to explode. If such an explosion is communicated to the charges in adjacent shells, a considerable number of these may also explode and violently disperse the remainder of the lot. This phenomena, which is not very well understood, is frequently referred to as "mass detonation".

Surprisingly, it has now been found that this hazard can be very greatly reduced by incorporating very fine particles of glass (particles passing through a 200 mesh screen) in the priming mixture. American rim-fire priming compositions always contain some ground glass or like material, but because priming mixtures compounded with glass powder finer than 200 mesh are not sufficiently sensitive, it has heretofore been customary to use only material of a coarser grade.

Typical compositions embodying the present invention, and in which the percentages are given by weight, are as follows:

Example I

| | Per cent |
|---|---|
| Guanyl-nitrosamino-guanyl-tetrazene | 2 |
| Lead styphnate | 40 |
| Lead nitrate | 30 |
| Lead sulfocyanate | 8 |
| Ground glass (to total 20%): | |
|     Very fine | 8 |
|     Coarser than 200 mesh | 12 |

Example II

| | Per cent |
|---|---|
| Guanyl-nitrosamino-guanyl-tetrazene | 2 |
| Lead styphnate | 40 |
| Barium nitrate | 30 |
| Lead sulfocyanate | 8 |
| Ground glass (to total 20%): | |
|     Very fine | 11 |
|     Coarser than 200 mesh | 9 |

Example III

| | Per cent |
|---|---|
| Lead styphnate | 30 |
| Lead hypophosphite | 10 |
| Lead nitrate | 12 |
| Barium nitrate | 28 |
| Ground glass (to total 20%): | |
|     Very fine | 10 |
|     Coarser than 200 mesh | 10 |

Example IV

| | Per cent |
|---|---|
| Lead styphnate | 30 |
| Lead hypophosphite | 8 |
| Lead nitrate | 12 |
| Barium nitrate | 20 |
| Ground glass (to total 30%): | |
|     Very fine | 15 |
|     Coarser than 200 mesh | 15 |

Depending upon the particular uses, some variation of proportions is possible and customary even in the type formulations. This will be clear from a consideration of Examples I and II, which are specific embodiments of the priming mixture type represented by the formula:

| | Per cent |
|---|---|
| Guanyl-nitrosamino-guanyl-tetrazene | 0.05–8 |
| Lead styphnate | 20–60 |
| Lead nitrate (or barium nitrate) | 20–40 |
| Lead sulfocyanate | 2–15 |
| Ground glass (to total 10%–35%): | |
|     Very fine | 5–25 |
|     Coarser than 200 mesh | remainder | and Examples III and IV, which are specific embodiments of the priming mixture type represented by the formula:

| | Per cent |
|---|---|
| Lead styphnate | 20–40 |
| Lead hypophosphite [1] | 5–20 |
| Lead nitrate [1] | 5–20 |
| Barium nitrate | 10–40 |
| Ground glass (to total 10%–40%): | |
|     Very fine | 5–25 |
|     Coarser than 200 mesh | remainder |

[1] When this mixture is wet (ordinarily with 10%–20% of water) for mixing and charging, the lead nitrate and hypophosphite react to form the explosive lead nitrato-hypophosphite presumably having the formula $PbNO_3 \cdot Pb(H_2PO_2)_2$.

The useful limits of the fine glass employed appear to be 25%–75% of the total glass in the priming mixture. Preferably the fine glass constitutes about one-half of the total glass used.

Other inert materials (that is, materials which do not furnish oxygen, or which do not oxidize as rapidly or easily as the explosives and fuels commonly used in the priming mixtures) in the form of fine particles have been found to accomplish a result similar to that obtained with the finely divided glass particles. When inert materials other than finely divided glass are used, it is preferred that they be substituted for some of the oxidizing agent (lead nitrate, etc.). Typical materials are pigments (natural and synthetic), metallic soaps, metal powders (metals which do not oxidize easily, such as lead, tin, bismuth, silver, etc.), etc.

The following table gives certain preferred specific materials and the amounts thereof which have been found satisfactory when replacing part of the oxidizing agent:

Table I

|  | Preferred range | Preferred amount |
|---|---|---|
|  | Percent | Percent |
| Prussian blue | 0.5–2 | 1 |
| Para Red [1] (Color Index 44) | 0.5–2 | 1 |
| Lamp black | 0.5–2 | 1 |
| Titanium dioxide | 1–5 | 2 |
| Carbsil [2] | 2–10 | 5 |
| Zinc stearate | 0.5–2 | 1 |
| Powdered lead | 1–10 | 5 |
| Litharge | 1–10 | 5 |
| Very fine powdered glass | 5–25 |  |

[1] An azo dye pigment (para nitraniline coupled with beta naphthols).
[2] A natural low grade black pigment mined in the southern Allegheny mountains. It is a silicious material containing carbon.

In priming mixtures where the lead nitrate reacts with lead hypophosphite, the substitution can only be made for the oxidizing agent other than lead nitrate (barium nitrate, etc.). When the inert material is added to a priming mixture instead of being substituted for an ingredient thereof, the quantity should be small, for example, about 1% (based on the weight of the original mixture).

The invention is not limited to rim fire ammunition. It can also be used advantageously in priming mixtures for center fire cartridges and shot gun shells.

That the present discovery is dependent upon the particle size of the inert material is clear from the fact that increasing the percentage of the usual granulation glass to as high as 50% of the priming composition is ineffective in preventing mass detonation.

The present invention is especially advantageous when employed with lead nitrato-hypophosphite formulations.

As many apparently widely different embodiments of this invention may be made without departing from the spirit and scope thereof, it is to be understood that this invention is not limited to the specific embodiments thereof except as defined in the appended claims.

I claim:

1. A priming mixture for ammunition containing an inert material granulated to pass a 200 mesh screen and present in a quantity sufficient to substantially inhibit mass detonation without material detriment to percussion sensitivity, such quantity varying with the characteristics of the specific inert material, but in no case being less than substantially 1% of the entire mixture.

2. An ignition mixture containing approximately:

| | Per cent |
|---|---|
| Lead styphnate | 30 |
| Lead hypophosphite | 10 |
| Lead nitrate | 12 |
| Barium nitrate | 28 |
| Glass: | |
|   Fine (passing 200 mesh screen) | 10 |
|   Coarse (retained by 200 mesh screen) | 10 |

3. An ignition mixture containing approximately:

| | Per cent |
|---|---|
| Lead styphnate | 30 |
| Lead hypophosphite | 10 |
| Lead nitrate | 12 |
| Barium nitrate | 28 |
| Glass: | |
|   Fine (passing 200 mesh screen) | 5–15 |
|   Coarse (retained my 200 mesh screen) | 15–5 |

4. A priming composition for ammunition of the lead nitrate-lead hypophosphite type containing at least 1% of an inert material which will pass a 200 mesh screen.

5. An ignition mixture containing substantially 20% of glass of which not less than 25% will pass a 200 mesh screen.

6. A priming mixture for ammunition containing between 5% and 25% of ground glass which will pass through a 200 mesh screen so as to substantially inhibit mass detonation of said mixture.

7. A priming composition for ammunition of the lead nitrate-lead hypophosphite type containing between 5% and 25% of ground glass which will pass a 200 mesh screen, said ground glass substantially inhibiting mass detonation of said composition.

WILLI BRÜN.